ns Patent [19]

Barnes et al.

[11] 3,837,675

[45] Sept. 24, 1974

[54] TRAILER HITCH FOR COUPLING WITH PICK-UP TRUCK

[75] Inventors: Roger L. Barnes, Hillsboro; David H. Hill, Fillmore, both of Ill.

[73] Assignee: Tri-Star Corporation, Fillmore, Ill.

[22] Filed: Feb. 14, 1973

[21] Appl. No.: 332,427

[52] U.S. Cl.............. 280/423 R, 280/433, 280/511
[51] Int. Cl............................................ B62d 53/08
[58] Field of Search......... 280/423 R, 438, 433, 434

[56] References Cited
UNITED STATES PATENTS

| 1,084,820 | 1/1914 | Pescatore.................... 280/438 R X |
| 1,316,735 | 9/1919 | Olds................................ 280/438 R |
| 2,366,892 | 1/1945 | Donnellan................... 280/423 R X |
| 2,925,286 | 2/1960 | Hodges et al. .............. 280/423 R X |
| 3,534,983 | 10/1970 | Alvery............................ 280/423 R |
| 3,650,546 | 3/1972 | Koenig........................... 280/423 R |

FOREIGN PATENTS OR APPLICATIONS 111,071   7/1940   Australia............................. 280/433

Primary Examiner—Leo Friaglia
Attorney, Agent, or Firm—Koenig, Senniger, Powers and Leavitt

[57] ABSTRACT

A hitch for coupling a goose-neck trailer to a towing vehicle (e.g., a pick-up truck) comprising a shoe carried by the goose-neck portion of the trailer and adapted for limited rotation relative to the trailer about any axis, and means mounted on the bed of the pick-up truck for receiving the shoe in a hitching position. This receiving means comprises abutment means engageable with the shoe for preventing movement of the shoe from its hitching position along a line extending the direction of travel of the pick-up truck and laterally of said line, hold-down members overlying portions of the shoe for preventing upward movement thereof, and a locking bar movable to and from a locking position in which it is engageable with the shoe for preventing movement of the shoe from its hitching position in the other direction along said line.

9 Claims, 8 Drawing Figures

PATENTED SEP 24 1974　　3,837,675

TRAILER HITCH FOR COUPLING WITH PICK-UP TRUCK

BACKGROUND OF THE INVENTION

This invention relates to a hitch for coupling a trailer to a towing vehicle, and more particularly, it is concerned with a hitch for coupling a so-called "gooseneck" trailer to a pick-up truck.

In general, a goose-neck trailer is a type of semi-trailer having a rigid hitching or goose-neck portion extending forward from the trailer for being hitched to a towing vehicle, such as a pick-up truck, at a point above or forward of the rear axle of the pick-up so as to distribute the weight of the trailer carried by the pick-up truck far forward on the truck. The goose-neck portion of the trailer reaches over the tailgate of the pick-up truck and is spaced above the top of cargo box of the pick-up truck so that the truck may be turned sharply relative to the trailer without contacting the goose-neck portion. Many trailer users, especially those who use a trailer only occasionally (e.g., a farmer hauling livestock to market or a vacationer pulling a travel trailer), have found goose-neck trailers particularly attractive because they offer heavy load carrying capability for low cost. Because a pick-up truck may be used as a tow vehicle (thus, eliminating the necessity for a special tractor) goose-neck trailer owners may use the pick-up truck for other purposes, and in many states avoid paying high license plate fees and road use taxes.

Reference may be made to such U.S. Pat. Nos. as 2,925,286, 3,164,398, 3,392,992 and 3,659,876 illustrating trailer hitches in the same general field as this invention.

More generally, conventional goose-neck trailer hitches generally require accurate maneuvering of the pick-up truck relative to the trailer to hitch the trailer. Thus, the hitching of the goose-neck trailer has proved to be a difficult and time-consuming job for a driver without another person to guide him as he maneuvers the pick-up truck. Also, many of these conventional hitches are bulky and effectively prevent the use of the pick-up truck for other purposes unless the hitch is removed from the truck.

SUMMARY OF THE INVENTION

Among the several objects of this invention may be noted that provision of a hitch for a goose-neck trailer which may be readily installed on the bed of any conventional pick-up truck and removed therefrom; the provision of such a hitch which automatically guides the hitching portion of the trailer to its hitching position; the provision of such a hitch which permits substantially unencumbered use of the pick-up truck for hauling purposes without removal of the hitch therefrom; and a provision of such a hitch which is easy to operate and which is of rugged and economical construction. Other objects and features of this invention will be in part apparent and in part pointed out hereinafter.

In general, this invention relates to a hitch for coupling a trailer to a towing vehicle comprising a shoe adapted to be carried by the trailer, means adapted to be secured to the vehicle for receiving the shoe with the shoe being slideable relative to the receiving means along a line extending generally in the direction of travel of the vehicle between an unhitched position in which the shoe is clear of the receiving means and a hitched position. This receiving means comprises abutment means engageable with the shoe when it is in its hitched position for preventing movement of the shoe in one direction along the line and also laterally of the line, and hold-down means for overlying portions of the shoe when the latter is in its hitched position to prevent upward movement of the shoe. The hitch further includes locking means engageable with the shoe for preventing movement thereof in the other direction along said line thereby to retain the shoe in its hitched position.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
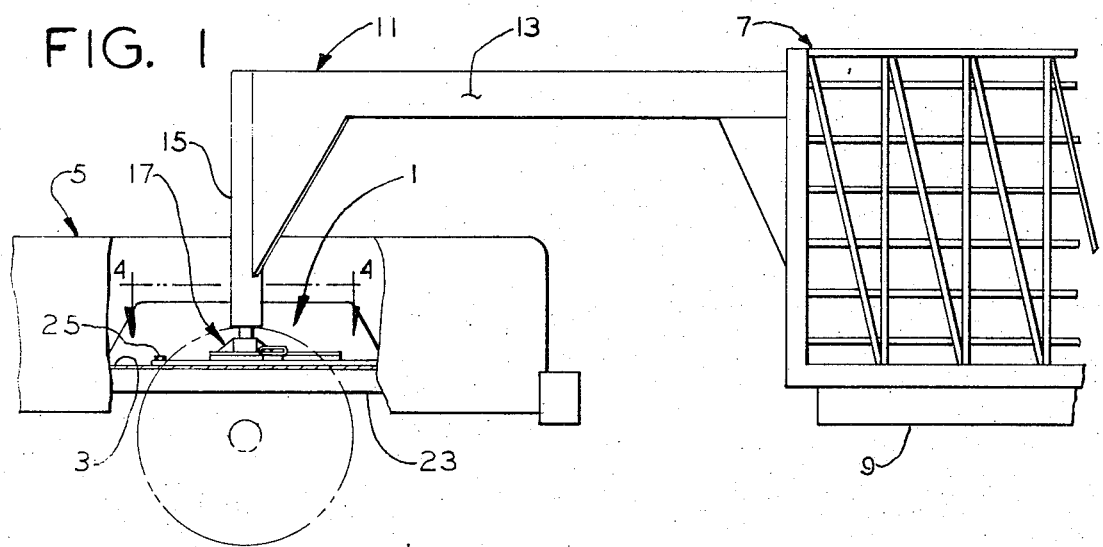
FIG. 1 is a side elevation of portions of a goose-neck trailer and a pick-up truck with portions of the truck broken away to show the trailer hitch of this invention.

Referring to the drawings, a trailer hitch of this invention indicated at its entirety at 1 is shown mounted on bed 3 of pick-up truck 5 (or another towing vehicle) for hitching a goose-neck trailer generally indicated at 7 to the pick-up truck. Hitch 1 is shown to be mounted above (or even somewhat forward of) the rear axle of the pick-up truck. The trailer has a main or cargo section 9 and a rigid goose-neck hitching section 11. This goose-neck section includes a pair of horizontal beams 13 each having their rearward ends rigidly secured to the upper front portion of the cargo section and extending forwardly and angling inwardly therefrom toward the longitudinal center line of the trailer. A vertical post 15 is rigidly secured to the forward ends of the goose-neck beams extending downwardly therefrom. With the trailer properly hitched to the pick-up truck, post 15 is positioned generally above the rear axle on the center line of the pick-up truck, beams 13 are spaced above the upper edges of the cargo box and tailgate of the pick-up truck, and cargo section 9 of the trailer is spaced rearwardly of the pick-up truck so that the trailer may freely rotate about a vertical axis extending through the post relative to the truck as the truck is maneuvered.

More particularly, hitch 1 comprises a hitching shoe generally indicated at 17 carried by the bottom end of post 15 and means generally indicated at 19 for receiving the shoe, this receiving means being secured to bed 3 of the pick-up truck. The shoe is slideable relative to the receiving means on a line (e.g., the longitudinal center line of the pick-up truck as indicated by the arrows in FIGS. 2–4) extending in the direction of travel of the pick-up truck between an unhitched position (shown in FIG. 3) in which the shoe is clear of the receiving means and a hitched position (shown in FIGS. 1, 2, 4 and 5).

Receiving means 19 comprises a rectangular bed plate 21 (shown in FIG. 4) of a plan area substantially larger than that of shoe 17. This bed plate is of sufficient width so as to span frame members 23 of the pick-up truck 5 (see FIG. 4) and is removably secured to the frame members by bolts 25. Thus all towing, braking and steering loads of the trailer are reacted directly into the pick-up frame above the rear axle. This bed plate also serves as a skid plate for shoe 17 as the latter slides relative to the pick-up truck between its hitched and unhitched positions. Receiving means 19 further includes a pair of abutment members 27a, 27b constituting abutment means secured as by welding to the top of the bed plate for engagement with shoe 17 when the shoe is in its hitched position so as to prevent movement of the shoe in one direction (e.g., forwardly relative to the pick-up truck) along the line of travel of the pick-up truck and also laterally of this line. A hold-down member 29a, or 29b is secured to the top of each respective abutment member for overlying portions of the shoe (see FIG. 7) when the shoe is in its hitched position to prevent any substantial upward movement of the shoe. A locking bar 31 (see FIG. 2) is engageable with the shoe for preventing movement of the shoe in the other direction (e.g., rearwardly) along the line of travel of the pick-up truck thereby to retain the shoe in its hitched position.

Figure 3:
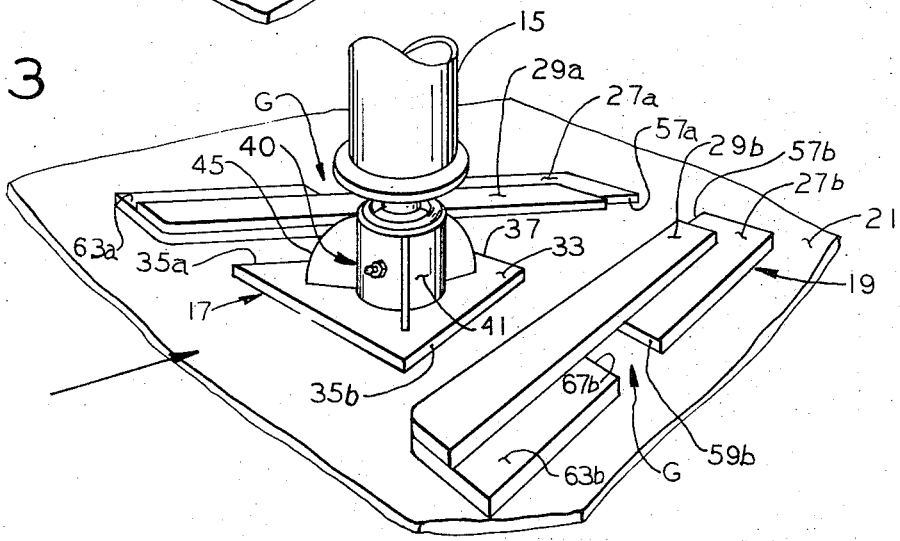
FIG. 3 is a view similar to FIG. 2 showing the hitching shoe in an unhitched position.

In FIG. 3, shoe 17 is shown to comprise a trapezoidal shaped shoe plate 33 having two converging edges 35a, 35b disposed generally laterally of the pick-up truck when the shoe is in its hitched position, a front or truncated edge 37 adjacent the converging ends of the converging sides and a rear or base edge 39 opposite the truncated edge. Although shoe plate 33 is shown to be trapezoidal, it will be understood that it may be of any shape having either a curvilinear or polygonal plan form so that when it is in its hitched position, the abutment means prevents movement in one direction along the line of travel of the vehicle and also laterally thereof. Means generally indicated at 40 is provided on the shoe plate for mounting it with respect to trailer 7 with the shoe plate adapted for limited rotation relative to the trailer about any axis. This means is shown to be a ball and socket connection including a cylindrical collar 41 welded to the top of the shoe plate with its bore 43 (see FIG. 5) opening upwardly. Gussets 45 brace the collar on the shoe plate. A ball member 47 having a shank 49 and a part spherical bulbous end 51 is secured to the bottom end of post 15. The bulbous end of the ball member is received within the bore of collar 41 and the bottom end of the ball bears against the top of shoe plate 33. A split ring 53 surrounds the shank portion of the ball member and is welded to the top of the collar thereby to hold the bulbous end captive within the bore of the collar in such manner as to permit limited rotation movement of the collar and shoe plate about any axis relative to post 15. This limited rotational movement permits the trailer to be freely towed by the pick-up truck without binding as the pick-up truck turns relative to the trailer or as the pick-up truck and/or the trailer encounters a bump so that they are at different elevations. A grease fitting 55 is provided on collar 41 to lubricate the ball member in the collar.

Figure 7:
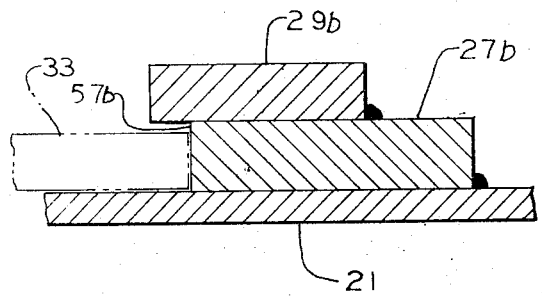
FIG. 7 is an enlarged vertical section taken on line 7—7 of FIG. 4 illustrating an abutment member in abutting relation with an edge of the shoe (shown in phantom) and a hold-down member secured to the top of the abutment member overlying a marginal, side portion of the shoe.
Figure 8:
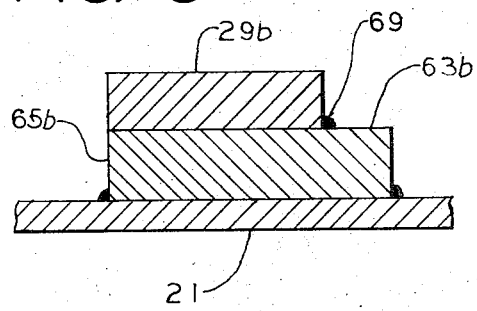
FIG. 8 is an enlarged vertical section taken on line 8—8 of FIG. 4 illustrating means for guiding the shoe toward its hitched position.

As illustrated in FIG. 7, abutment members 27a, 27b are somewhat thicker than shoe plate 33. Each abutment member has an inwardly facing abutment edge 57a, 57b, respectively, engageable by a respective convergent edge 35a, 35b of the shoe plate when the latter is in its hitched position. Each abutment member has a rear or diverging end, as respectively indicated at 59a, 59b which is generally in line with the rear edge 39 of the shoe plate when the latter is in its hitched position (see FIG. 4).

Guide means generally indicated at 61 is provided to automatically guide shoe plate 33 toward its hitched position as the shoe plate is moved relative to the receiving means toward its hitched position. This guide means is shown to comprise a pair of guide members 63a, 63b each having an inwardly facing guide edge 65a, 65b, respectively, and a forward convergent end 67a, 67b, respectively (see FIGS. 2–4). These guide members are secured to bed plate 21, as by welding, such that each is generally in line with the abutting edge 57a, 57b of its respective abutment member 27a or 27b and is offset inwardly toward the center line of the vehicle relative to the abutment edge. The forward convergent end of each guide member is spaced apart from the rear or divergent end of its respective abutment member thereby to constitute a gap G. The abutment members and the guide members are substantially the same thickness. Hold-down members 29a, 29b are each longer than their respective abutment members 27a, 27b to which they are secured. Each hold-down member overhangs the abutment edge 57a or 57b of its respective abutment member thereby to overlie a side marginal portion of shoe plate 33 adjacent its respective convergent edge 35a or 35b (see FIG. 7) so as to prevent any substantial upward movement of the shoe plate from its hitched position. Each hold-down member extends from its abutment member to its guide member spanning gap G therebetween. The hold-down members are welded to the top of their respective abutment and guide members as indicated at 69.

Figure 6:
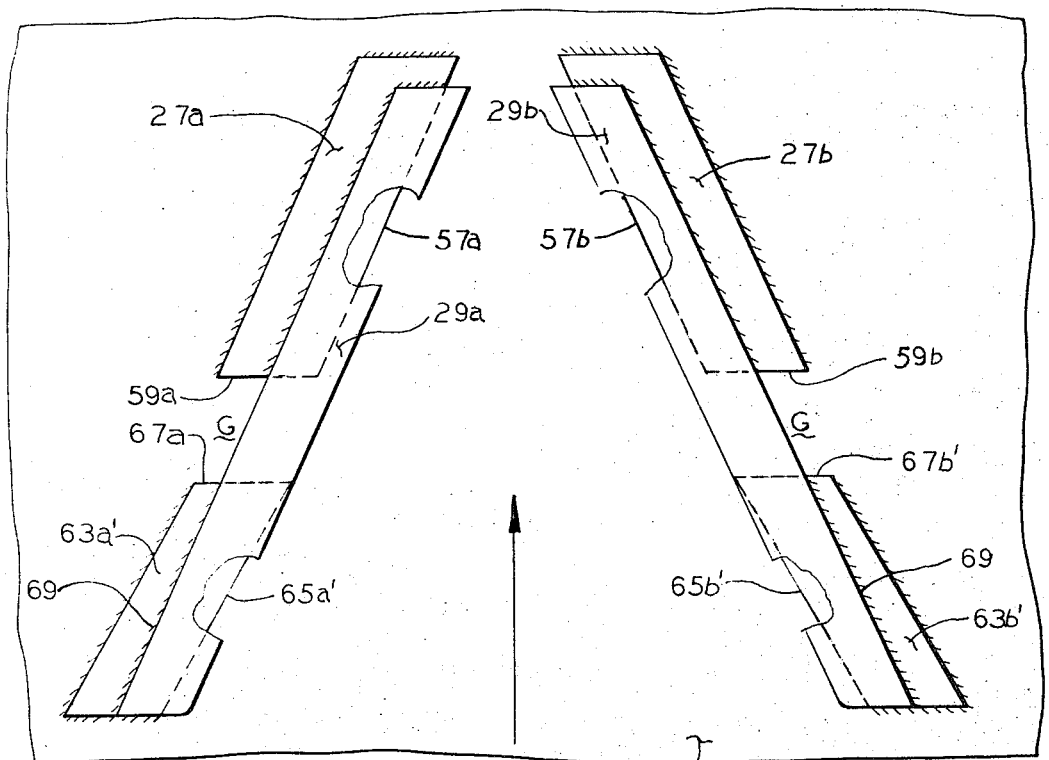
FIG. 6 is an enlarged view similar to FIG. 4 showing another embodiment of this invention with the shoe removed and with parts broken away.

A modified guide means 61 is shown in FIG. 6 in which corresponding but primed reference characters indicate parts corresponding to the embodiments heretofore described and in which the rear portion of each guide edge 65a', 65b' of each of the guide members 63a' or 63b' angles out away from center line of the pick-up truck and from the plane of the abutment edge 57a or 57b of its respective abutment member 27a or 27b. Whether the guide edges are generally in line with (FIG. 4) or angle away from the plane of its respective abutment edge (FIG. 6), the guide members act to automatically rotate the shoe plate about ball member 47 so as to properly align the shoe plate relative to the abutment members as the shoe plate is moved on the bed plate toward its hitched position.

Figure 2:
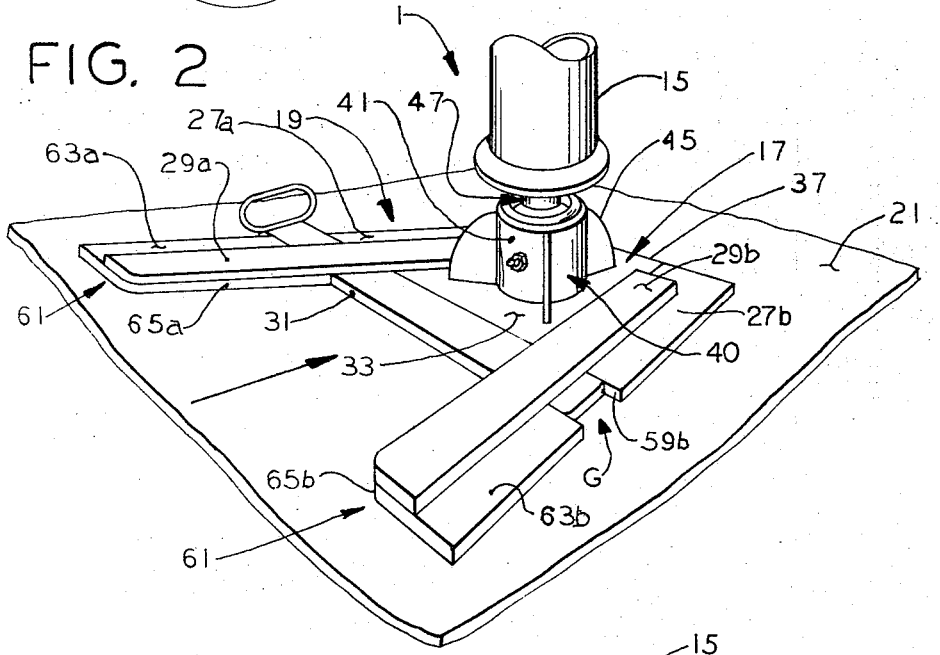
FIG. 2 is an enlarged perspective of the hitch of this invention showing a hitching shoe carried by the trailer in its hitched position.
Figure 4:
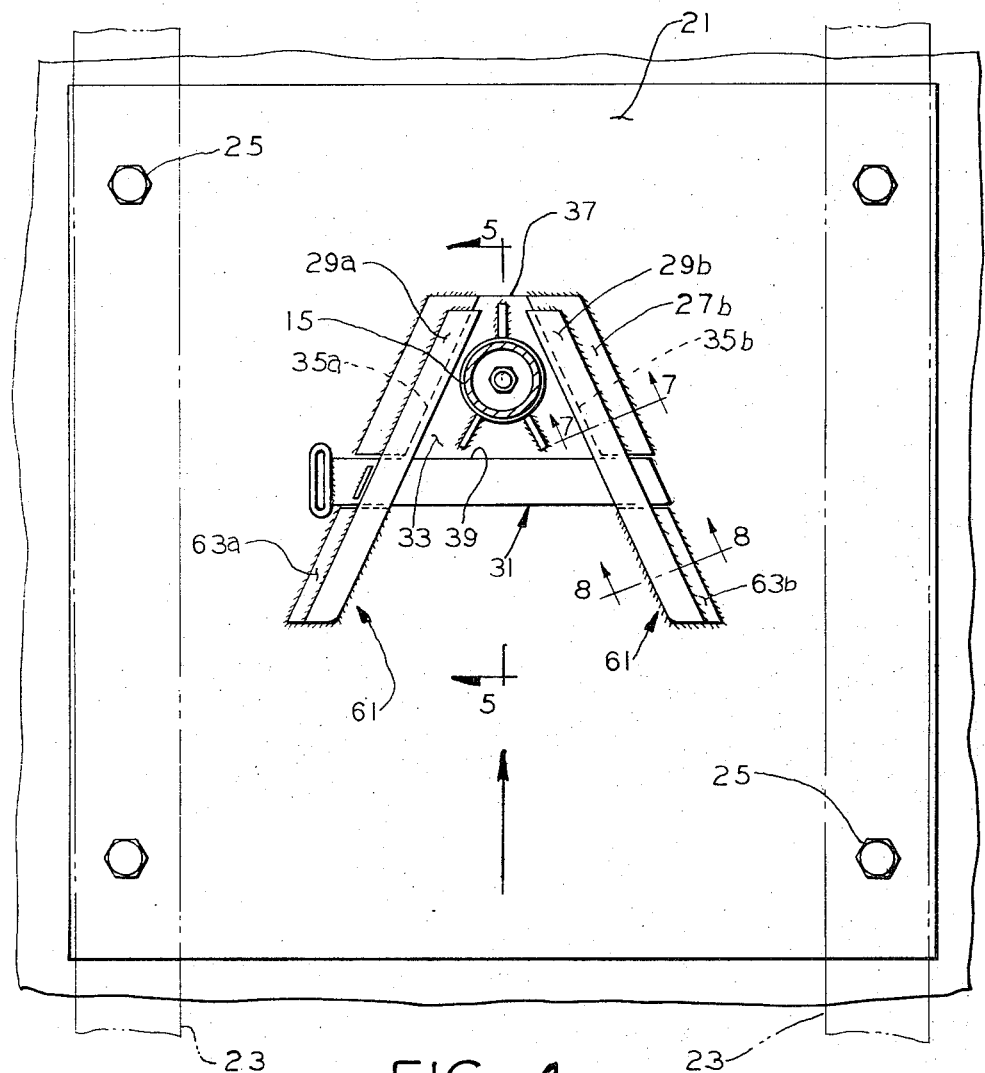
FIG. 4 is an enlarged horizontal section taken on line 4—4 of FIG. 1.
Figure 5:
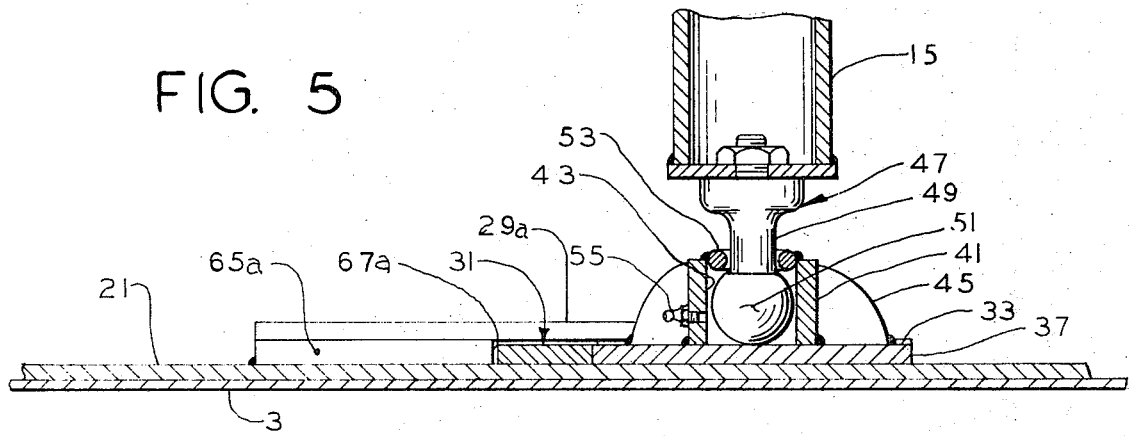
FIG. 5 is an enlarged longitudinal vertical section taken on line 5—5 of FIG. 4.

In FIG. 5, locking bar 31 is shown to be substantially the same thickness as shoe plate 33, and is somewhat narrower than gaps G between rear ends 59a, 59b of the abutment members and the front ends 67a, 67b of the guide members so that the locking bar may be easily slid axially through the gaps to its locking position. As is shown in FIGS. 2, 4 and 5, locking bar 31 is engageable with the rear or base edge 39 of the shoe plate to retain it in its hitched position. The locking bar has a handle 71 at one end thereof to facilitate movement of the bar in and out of its locking position. A stop (not shown) may be provided to prevent inadvertent movement of the locking bar from its locking position. It will be noted that the rear ends 59a, 59b of the abutment members and the forward ends 67a, 67b of the guide members prevent fore and aft movement of the locking bar when it is in its locked position.

With the bed plate 21 secured to bed 3 of pick-up truck 5, and with shoe 17 mounted on the bottom end of post 15 of goose-neck trailer 7 as heretofore described, the goose-neck trailer may readily be hitched to the pick-up in a manner as will appear. The shoe is first rotated on ball member 47 so that its truncated edge 37 faces generally forward relative to the pick-up truck. The pick-up truck is then backed toward the trailer to a position in which the shoe is directly above the rear portion of bed plate 21 and is near the center line of the pick-up truck. The front end of the trailer is then lowered by means of a jack (not shown) conventionally carried by goose-neck trailers until the shoe plate 33 bears on the top of the bed plate. The pick-up truck is then backed toward the trailer to effect movement of the shoe toward its hitched position. If the shoe plate is not centered with respect abutment members 27a, 27b, one of its convergent edges 35a or 35b will contact a guiding edge 65a or 65b of a respective guide member 63a or 63b or will contact an abutment edge 57a or 57b of its abutment members in such manner so as to move the shoe plate toward the center line of the pick-up truck. Continued backing of the pick-up truck causes the shoe to move forwardly toward its hitched position. Thus, the guide and abutment members automatically guide the shoe toward its hitched position. As the shoe plate moves toward its hitched position, its convergent edges engage their respective abutting edges 57a, 57b thereby to prevent further forward and lateral movement of the shoe plate relative to the receiving means 19. As is shown in FIG. 7, with the shoe plate in its hitched position, hold-down members 29a and 29b overlie the side marginal portions of the shoe plate along its convergent edges so as to prevent any substantial upward movement of the shoe plate from its hitched position. Locking bar 31 is then inserted through gaps G and moved to its locking position (FIGS. 2, 4 and 5) in which it is in close spaced relation or in engagement with the rear base edge 39 of the shoe plate thereby to retain the shoe plate in its hitched position. To unhitch the trailer, the locking bar is moved from its locked position and the pick-up truck is driven forwardly until the shoe plate is in an unhitched position clear of hold-down members 29a, 29b (FIG. 3). Thus it can be seen that the self-aligning, self-clearing trailer hitch 1 of this invention permits one person quickly and easily to hitch a goose-neck trailer to a pick-up truck and to unhitch it therefrom.

It will also be understood that the convergent ends of the abutment members 27a, 27b could be disposed rearwardly of the pick-up truck rather than forwardly such as described above and as shown in the drawings. With the convergent ends at the rear, and with the shoe plate 33 bearing on the bed plate forwardly of the diverging ends of the abutment members in an unhitched position with the truncated edge of the shoe plate facing rearwardly, the pick-up truck may be driven forwardly to effect relative movement between shoe 17 and receiving means 19 for movement of the shoe toward its hitched position. However, with the convergent ends of the abutment members toward the rear, goose-neck section 11 of trailer 7 must be substantially longer so that the shoe may be moved to its unhitched position forward of the rear axle.

It will also be noted that bed plate 21 together with its abutment members 27a, 27b, its guide members 63a, 63b and its hold-down members 29a, 29b secured to the top thereof projects only a relatively small distance above bed 3 of the pickup truck (e.g., approximately 1 - 1-½ inches) and thereby does not substantially interfere with loading and unloading cargo in the bed of the pick-up truck when the trailer is not hitched thereto.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A hitch for coupling a trailer to a towing vehicle comprising a shoe adapted to be carried by the trailer for limited rotation relative to the trailer about any axis, said shoe comprising a polygonal-shaped plate having one edge at the rearward end of the plate relative to the direction of travel of the vehicle and a pair of convergent edges facing generally laterally of the vehicle with their converging ends toward the front of the vehicle, means including a bed plate adapted to be secured to said vehicle for receiving said shoe, said shoe being slideable on the bed plate on a line extending in the direction of travel of the vehicle between an unhitched position in which the shoe is clear of the receiving means and a hitched position, said receiving means comprising a pair of abutment members disposed on opposite sides of said line, each abutment member having a vertical edge for engagement with a respective convergent edge of said shoe plate thereby to prevent movement of the shoe plate in one direction along said line and laterally thereof when said shoe plate is in its hitched position and holddown means for overlying portions of said shoe when the latter is in its hitched position to prevent any substantial upward movement of the shoe, and a locking bar axially slidable on the bed generally perpendicular to said line to and from a locking position in which said bar is engageable with said one edge of said shoe plate for preventing movement of the shoe plate from its hitched position along said line in said other direction and means on said bed plate for mounting said locking bar for sliding movement to and from its locking position.

2. A trailer hitch as set forth in claim 1 further comprising a pair of guide members secured to the bed plate on opposite sides of said line from one another for rotating said shoe plate for alignment of said convergent edges thereof with said vertical edges of said abutment members and for guiding said shoe plate along said line for movement between its hitched and unhitched positions.

3. A trailer hitch as set forth in claim 2 wherein each guide member is generally the thickness of said shoe plate and is secured to the bed plate generally in line with a respective abutment member on one side of said line with one end of each said guide member constituting its converging end and with one end of its respective abutment member constituting its diverging end, spaced apart from one another with a gap therebetween, and wherein each said hold-down member is secured to the top of both its respective abutment and guide members on one side of said line, said hold-down member spanning the gap between the spaced apart ends of said respective abutment and guide members.

4. A trailer hitch as set forth in claim 3 wherein said locking bar is axially slideable on said bed plate through said gaps, said bar being movable to and from a locking position in which it extends generally laterally of said line and is engageable with said third edge of the shoe plate for preventing movement of the shoe plate from its hitched position along said line in said other direction.

5. A trailer hitch as set forth in claim 3 wherein each said guide member has an edge facing said line with said edge of each guide member being parallel to said edge of its respective abutment member and being offset inwardly toward said line relative to said edge of its respective abutment member.

6. A trailer hitch as set forth in claim 3 wherein each said guide member has an edge facing generally toward said line with said edge of each guide member angling relative to said abutment edge of its respective abutment member so that the end portion of said guide edge distal from its respective abutment member angles away from said line and away from said abutment edge.

7. A hitch for coupling a trailer to a towing vehicle comprising a shoe adapted to be carried by the trailer, said shoe further comprises means for mounting the shoe to with respect to said trailer with the shoe adapted for limited rotation relative to the trailer about any axis, said mounting means comprising ball and socket means including a ball member having a shank portion adapted for connection to said trailer and a part-spherical bulbous end, a cylindric collar secured to the upper surface of said shoe with its bore opening upwardly, and means for holding said bulbous end captive within the bore of said collar permitting limited rotation of the ball member about any axis relative to the collar, said hitch further comprising means adapted to be secured to said vehicle for receiving said shoe, said shoe being slidable relative to said receiving means on a line extending in the direction of travel of the vehicle between an unhitched position in which the shoe is clear of the receiving means and a hitched position, said receiving means comprising abutment means engageable with the shoe when it is in its hitched position for preventing movement of the shoe in one direction along said line and also laterally of the line, and hold-down means for overlying portions of said shoe when the latter is in its hitched position to prevent any substantial upward movement of the shoe, and locking means engageable with the shoe for preventing movement of the shoe in the other direction along said line thereby to retain said shoe in its hitched position.

8. Apparatus as set forth in claim 1 wherein said abutment members converge toward said line with their converging ends toward the front of the vehicle, whereby to hitch the trailer to the vehicle, said shoe plate is positioned on the bed and said vehicle is backed toward the trailer thus effecting movement of the shoe plate along said line from its unhitched to its hitched position.

9. A trailer hitch for coupling a goose-neck trailer to a towing vehicle, such as a pick-up truck, comprising a shoe carried by the goose-neck portion of the trailer for limited rotation relative to the goose-neck portion about any axis, said shoe comprising a polygonal-shaped plate having one edge at the rearward end of the plate relative to the direction of travel of the vehicle and a pair of convergent edges facing generally laterally of the vehicle with their converging ends toward the front of the vehicle, a bed plate secured to the bed of the vehicle, said shoe being movable on the bed plate along a line extending in the direction of travel of the vehicle between an unhitched position and a hitched position, means on said bed plate for receiving the shoe plate when it is in its hitched position comprising a pair of abutment members disposed on opposite sides of said line, each abutment member having a vertical edge for engagement with a respective convergent edge of said shoe plate thereby to prevent movement of the shoe plate in one direction along said line and laterally thereof when said shoe plate is in its hitched position, a pair of hold-down members each secured to the upper face of a respective abutment member with a portion of said hold-down member overhanging said vertical edge of its abutment member for overlying an adjacent marginal portion of said shoe plate when the latter is in its hitched position for preventing any substantial vertical movement of the shoe plate, a locking member axially slideable on the bed generally perpendicular to said line to and from a locking position in which said bar is engageable with said one edge of said shoe plate for preventing movement of the shoe plate from its hitched position along said line in said other direction and means on said bed plate for mounting said locking bar for sliding movement to and from its locking position.

* * * * *